April 21, 1959 W. H. KING, JR 2,883,649
GALVANOMETER DIGITIZER
Filed July 26, 1955 2 Sheets-Sheet 1

William H. King, Jr. Inventor

By W. N. Wright Attorney

April 21, 1959     W. H. KING, JR     2,883,649
GALVANOMETER DIGITIZER

Filed July 26, 1955     2 Sheets-Sheet 2

William H. King, Jr.    Inventor

By   *W. N. Wright*   Attorney

United States Patent Office

2,883,649
Patented Apr. 21, 1959

2,883,649

GALVANOMETER DIGITIZER

William H. King, Jr., Florham Park, N.J., assignor to Esso Research and Engineering Company, a corporation of Delaware Application July 26, 1955, Serial No. 524,475

8 Claims. (Cl. 340—190)

This invention concerns novel means for determining the maximum value of electrical transients. The invention particularly relates to apparatus employed in combination with a light deflection type of galvanometer adapted to convert galvanometer light deflections to a series of pulses which can be counted to determine deflection of the light beam.

It is frequently desirable to determine the maximum value of electrical transients for a number of purposes. One example of this occurs in the field of mass spectrometry where a number of voltage or current maxima are recorded and must be determined in order to compute the composition analyzed. In this and other examples, the voltage peaks involved may be extremely sharply peaked and high scanning rates may be used so that real problems are involved in detecting the maximum value of such peaks due to the short duration of them. A number of techniques have been developed intended to accomplish this objective, although these are generally characterized by difficulties due to the problem of sensing the beginning and top of the peak voltage accurately and due to limitations in mechanical elements involved.

Figure 1:
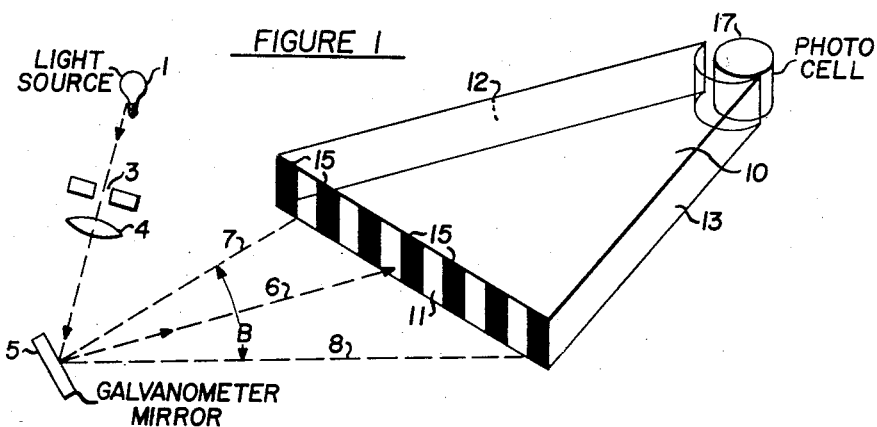
Figure 2:
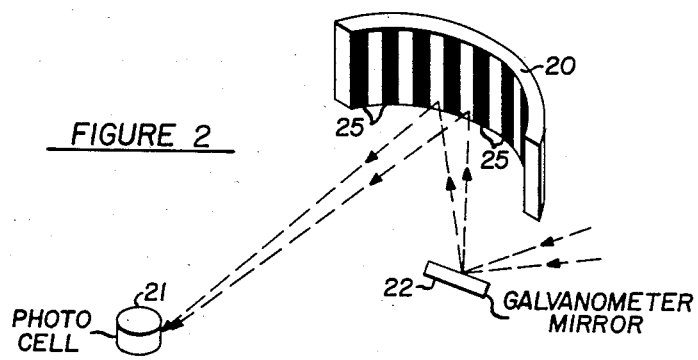
Figure 3:
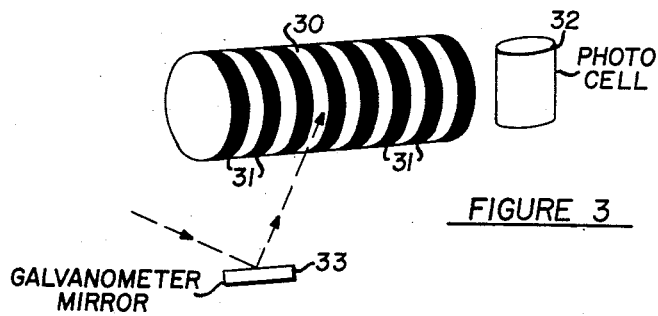
Figure 4:
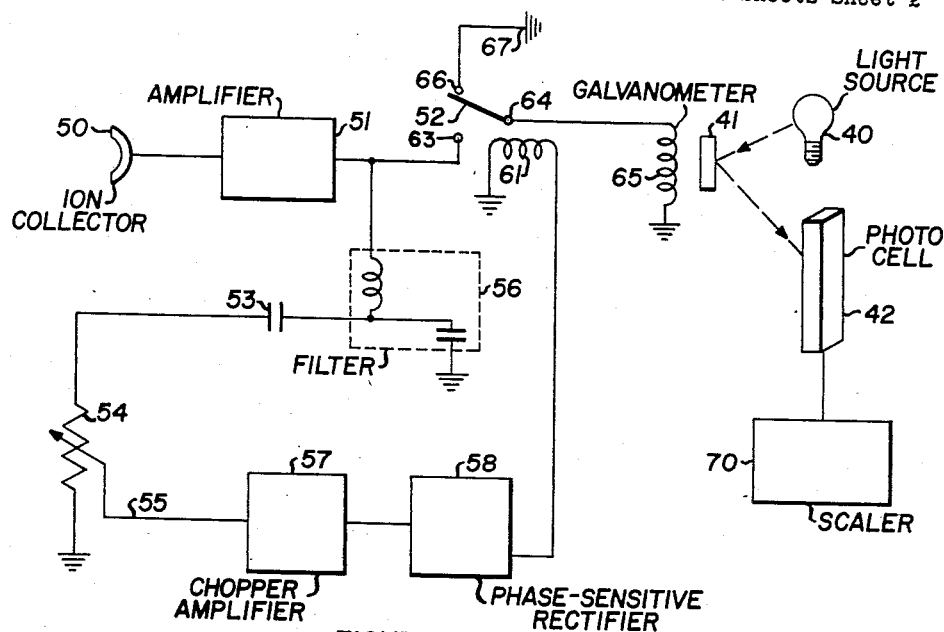
Figure 5A:
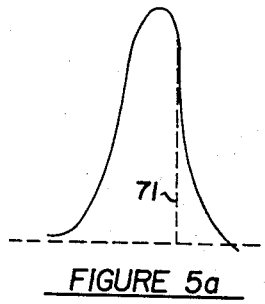
Figure 5B:
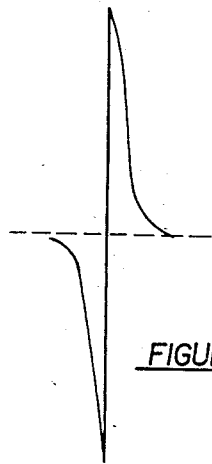
Figure 5C:
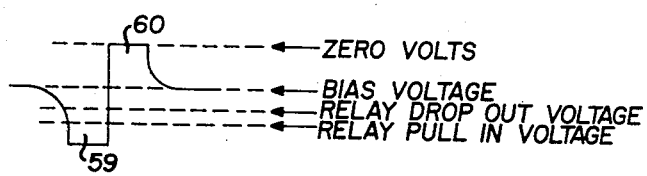

It is the principal object of this invention to provide a method and apparatus for determining maximum values of voltage transients while avoiding any limitations due to mechanical elements required in the system. It is a further object to detect such voltage maxima while avoiding the necessity for precisely determining the instant at which the maximum voltage occurs. These and other objects of the invention will become apparent from the following description of the invention, with reference to the accompanying drawings, in which:

Figure 1 diagrammatically illustrates the basic elements of the galvanometer digitizer of this invention; and Figure 2 illustrates an alternate embodiment of the invention; and Figure 3 illustrates a still further embodiment of the invention; and Figure 4 diagrammatically illustrates the electrical circuits to be used in combination with the galvanometer digitizer of this invention in the preferred embodiment of the invention; and Figures 5a, 5b, and 5c illustrate the wave form of voltage transients in different portions of the circuit of Figure 4.

Referring first to Figures 1, 2 and 3, the operative principles of this invention are illustrated. The invention employs a conventional type of light deflecting galvanometer in which light is directed from a light source 1 through a slit 3 and a collimating lens system 4, so as to be reflected from the galvanometer mirror 5. The galvanometer mirror is driven by a current or voltage sensitive electro-magnetic drive means so that light beam 6 reflected from mirror 5 will be deflected within the angular limits beta dependent upon the magnitude of the electrical transients. Thus, for example, it may be assumed that the light beam will have a limiting position indicated by line 7 when zero voltage is impressed on the galvanometer and that the light beam will have a limiting position 8 when the maximum voltage for which the galvanometer is designed is impressed on the system.

In accordance with this invention, a light interrupting means is positioned so as to lie in the plane of deflected light from the galvanometer and so as to cover an angular distance equal to the maximum galvanometer deflection beta. As will be developed, a variety of light interrupting means may be employed and in Figure 1, one such type is shown comprising a wedge of transparent material 10, having the face 11 and the sides 12 and 13. Wedge 10, for example, can be constructed of a plastic such as Lucite or alternatively may constitute glass, providing all external surfaces are polished. The face 11 of the wedge 10 is marked or masked so as to have alternate areas 15 which are light opaque. The required opacity may be obtained by inking or painting alternate areas in the fashion illustrated or suitable masks or the like may be employed. For greatest accuracy, extremely narrow, closely spaced areas will be employed.

In the arrangement illustrated, when a signal is received by the galvanometer, the light beam of the galvanometer will be deflected along the face 11 of the wedge 10 from the null position indicated by line 7 toward the limiting position indicated by line 8. Consequently, depending upon the value of the activating signal, a given number of opaque areas 15 will be traversed by the deflected light beam. During the course of this light deflection, a series of light pulses will be passed through the transparent areas of face 11 and will be directed towards the apex of wedge 10. Transmission to the apex will occur by reflection of light from surfaces 12 and 13, so that wedge 10 functions to collect and direct transmitted light to the photocell 17 positioned at the apex of the wedge 10.

In using the arrangement of Figure 1, let it be assumed that a voltage transient varying from zero to a maximum value and back to zero is impressed on the galvanometer. The light beam will then be deflected from a null position to a maximum position and back to a null position, causing the light beam to pass over a given portion of the face 11 of wedge element 10. Consequently, a number of light pulses will be directed to the photocell 17 equal in number to twice the number of the transparent areas between the opaque areas 15 along the portion of the face 11, traversed by the deflecting light beam. Consequently, by determining the number of light pulses detected by photocell 17, the digital value of the detected voltage transients will be indicated.

The principles of this invention may be embodied in a wide variety of forms employing different methods for securing translation of a deflecting galvanometer light beam into light pulses proportional in number to the light deflection. Figures 2, 3 and 4, illustrate alternative means for accomplishing this.

In Figure 2, a focusing mirror 20 is positioned with respect to a photocell 21, so that light reflected from galvanometer mirror 22 will be reflected from mirror 20 so as to focus on the photocell 21. By arranging opaque masking elements 25 on the reflecting surface of the mirror 20, a light beam deflected along an arc of the mirror 20 will develop a series of light pulses impinging on the photocell 21. It is apparent that this principle may also be employed by partially silvering mirror 20 so as to have alternate light transparent and light reflecting areas for use as described.

Referring now to Figure 3, another alternate method for converting a deflecting light beam to a series of light pulses is illustrated. In Figure 3, a plastic rod 30, having light transmitting properties is illustrated. The rod is provided on its external surface with a series of light opaque areas 31. A photocell 32 is positioned adjacent one end of this rod. In this arrangement, light deflected from galvanometer mirror 33, as illustrated, will be transmitted from any transparent portions of the rod to the photocell 32. Consequently, light deflected by the galvanometer along a given length of the rod, in proportion to the value of a transient signal, will cause a number of light pulses to impinge on photocell 32 proportional in number to the length of the rod along which the light is deflected.

Referring to the right-hand portion of Figure 4, a still further embodiment of this element of the present invention is illustrated. In this embodiment of the invention, light from a light source 40 is reflected from a galvanometer mirror 41 along an extended strip type of photocell 42. Photocell 42 may constitute a barrier layer photocell having a length equal to the maximum deflection of the galvanometer light beam. The surface of the photocell exposed to the galvanometer light beam may be masked or marked so as to provide alternate opaque and transparent areas of the nature described above. Again therefore, use of a photocell of this type will develop a series of detected pulses proportionate in number to the deflection of the galvanometer light beam.

In the practical utilization of this invention, employing the light pulsing systems described heretofore, a circuit such as that shown in Figure 4 is preferably employed. In Figure 4, a preferred embodiment of the invention is illustrated showing the particular application of the invention to detection of voltage maxima developed at the ion collector of a mass spectrometer. The description of Figure 4 may be read with drawings 5a, 5b and 5c, which illustrate voltage wave forms existing at different portions of the circuit of Figure 4.

Ion currents detected by ion collector 50 of the mass spectrometer can have a configuration such as that illustrated in Figure 5a. These ion currents are applied to amplifier 51 wherein they are amplified sufficiently for use in the remaining portions of the circuit shown. The conventional mass spectrometer amplifier (electrometer) may be used for this purpose and a current amplification factor of about $10^7$ is adequate.

The output of amplifier 51 is connected to one terminal of a relay 52 which is normally biased as illustrated. The output of amplifier 51 is series-connected to a condenser 53 and a resistor 54 which is connected to ground potential and has a variable tap 55. This condenser-resistor combination provides a differentiating circuit which serves to indicate the initiation of a voltage peak with a reversal of polarity at the maximum value of the peak and a decay back to a base-line value after the peak voltage is passed. The output of condenser 53 and resistor 54 in response to a signal such as that shown in Figure 5a is illustrated by Figure 5b. In using this system, it is preferred that the output of amplifier 51 be passed through a filter 56 prior to being impressed on the differentiating circuit. Filter 56 may constitute a simple LC filter of the nature illustrated and serves to reduce high frequency noise pulses which may be present in the output of amplifier 51.

The tap 55 of resistor 54 of the differentiating circuit provides a means of varying the sensitivity of the circuit to different size peaks when that is desired.

The output of the differentiating circuit may then be impressed on a chopper amplifier 57 which amplifies the output of the differentiating circuit using a voltage gate to cut off the sharply peaked limits. The output of the chopper amplifier 57 is therefore of the wave form shown in Figure 5c. The phase sensitive rectifier 58 which is normally an integral part of the chopper amplifier is biased such that the wave form (Figure 5c) is superimposed on a D.C. voltage. This output is impressed on relay coil 61. When a maxima begins to appear, coil 61 is energized beyond the pull-in voltage by pulse 59, and contacts 63 and 64 close, energizing the galvanometer coil 65. When the voltage reaches maximum, the voltage applied to relay coil 61 drops to zero volts, contacts 63 and 64 open, and contacts 66, 64 close grounding the galvanometer 65. Since relays take a finite time to open or change contacts, the galvanometer will ground after the maximum voltage occurs. It will be apparent from what has been said that relay 52 as normally biased in the position illustrated, serves to maintain galvanometer 65 at ground potential through terminal 66 and the grounding connection 67. However, whenever a voltage maxima is developed at the ion collector 50, the differentiating circuit connected as illustrated to relay 52 causes relay 52 to close, permitting the output of amplifier 51 to actuate galvanometer 65.

In the manner described formerly, impressing signal 5a on galvanometer 65 will cause deflection of the galvanometer light beam along the linearly extended photocell 42. Since the face of photocell 42 is masked or marked at sequential areas, deflection of the light beam along the photocell will cause a number of voltage pulses to be developed by the photocell for transmission to scaler 70. Scaler 70 is of conventional character and serves to count the number of electrical pulses developed by the photocell during deflection of the galvanometer light beam. Because of the nature of the circuit illustrated which is connected to relay coil 61, relay 52 will be caused to ground galvanometer 65 shortly after a maximum voltage peak is impressed on the circuit. This will result in galvanometer 65 "seeing" a signal such as illustrated in Figure 5a following dash-line 71 as the galvanometer is grounded by operation of relay 52. By grounding the galvanometer in this fashion shortly after the voltage maximum, the circuit is placed in condition and is operative to distinguish between closely adjacent or somewhat overlapping voltage maxima.

As described therefore, this invention concerns a mechanically simple arrangement to convert light deflections of a galvanometer to a digital output. By deflecting a galvanometer light beam along a linear series of alternate light opaque and light transparent areas, a series of light pulses are developed proportional in number to the deflection of the galvanometer light beam. These light pulses are detected by a photocell and are counted by a scaler circuit so that the output of the scaler will be a digit proportional to the deflection of the galvanometer and equal to twice the number of light opaque or light transparent areas traversed.

It is apparent that this invention may be used in a variety of modified or alternative forms. In actual use, for example, it is frequently desirable to provide switching means to attenuate signals supplied to the galvanometer or to switch signals to different galvanometers so as to cover different sensitivity ranges. Again, for example, in some applications, it may be desirable to employ logarithmically spaced scales instead of evenly spaced scales as the light interruption means between the photocell and the galvanometer so that the output of the system will be a logarithmic rather than linear function of galvanometer deflection. These and other modifications of the invention are embraced within the scope of the invention defined by the following claims.

What is claimed is:

1. A galvanometer digitizer comprising in combination, a voltage signal source, an oscillograph galvanometer having an energizing coil, a main signal transmission circuit between said coil and signal source, a relay in said main circuit biased to connect said coil to ground, a differentiating circuit connected in said main circuit between said signal source and said relay, said differentiating circuit including means to energize said relay to overcome said bias and connect said coil to said signal source in response to a voltage signal therefrom of predetermined polarity, and to de-energize said relay in response to a reversal of polarity of said signal, whereby to reconnect said coil to ground.

2. A device to determine the magnitude peaks of transient voltage signals, comprising in combination, a voltage signal source, means to convert signals from said source to form a pulsed light beam, said conversion means including a light source forming a directed light beam, an oscillograph galvanometer having an activating coil energizeable by said voltage signals, photo-sensitive means activated by said pulsed light beam, a main voltage signal transmission circuit, a relay in said circuit including connections to said signal source, to said galvanometer coil, and to ground, said relay being biased to connect said coil to ground, a branch circuit connected in said main circuit intermediate said voltage source and said relay connection thereto, said branch circuit including voltage signal differentiating means adapted to energize said relay, in response to a voltage signal of predetermined polarity from said source, whereby to overcome the bias of said relay and to connect said galvanometer coil in circuit with said signal source, and whereby to de-energize said relay, in response to reversal of said voltage signal polarity, reconnecting said galvanometer coil to ground.

3. An apparatus according to claim 2 wherein said photosensitive means is a linearly extended photo cell and said means to convert signals from said source to form a pulsed light beam includes a surface portion on said photo-sensitive means providing successive, alternate transparent and opaque areas along the length of said surface portion.

4. A device to determine the magnitude peaks of transient voltage signals comprising in combination, a voltage signal source, a light source adapted to form a directed light beam, a light beam deflecting galvanometer disposed so as to intercept the path of said directed light beam, said galvanometer having an activating coil energizeable by said voltage signals to deflect said directed light beam through an angular deflection path wherein the angular limits of said path are substantially determined by and proportional to the magnitude of a coil energizing voltage signal, means disposed across said angular deflection path, at least including the outside limits thereof, to redirect and focus said beam, said means including a surface portion exposed in said path providing a linear series of linearly spaced, light transmitting areas in said angular beam deflection path whereby to produce a sequential pulsation of said focused beam, photo-sensitive means disposed substantially at the point of focus of said pulsed, deflected beam, a main voltage signal circuit connected to said voltage signal source and including a relay directly connected to said galvanometer coil and having connections to said main circuit and to ground alternately, said relay being biased to connect said galvanometer coil to ground, a branch circuit connected in said main voltage signal circuit intermediate said signal source and said main circuit relay connection, said branch circuit including means to energize said relay, in response to a voltage signal of predetermined polarity from said signal source, whereby to overcome said relay bias and to connect said galvanometer coil in said main circuit, and whereby to de-energize said relay, in response to reversal of polarity in said voltage signal, to reconnect said galvanometer coil to ground.

5. An apparatus according to claim 4, wherein in said means to redirect and focus said deflected beam said surface portion in said beam path comprises a linear series of parallel, alternate, light transparent and light opaque areas in said surface portion.

6. An apparatus according to claim 4, wherein said means to redirect and focus said deflected beam comprises a wedge shaped, transparent, light transmitting element, said element having an apex end extending toward said photo-sensitive means, and a base end providing said surface portion exposed in said deflected light beam path.

7. An apparatus according to claim 4, wherein in said means to redirect and focus said deflected light beam, said surface portion exposed in said deflected light beam path comprises a concave surface portion, and said series of linearly spaced light transmitting areas are light reflecting areas.

8. An apparatus according to claim 4 wherein such means to redirect and focus said deflected beam comprises a transparent rod adapted to conduct light internally thereof, said rod being positioned with one end adjacent and directed toward said photo-sensitive means, and providing a longitudinal surface portion exposed in said deflected light beam path.

References Cited in the file of this patent

UNITED STATES PATENTS

| | | |
|---|---|---|
| 2,398,046 | Schaefer | Apr. 9, 1946 |
| 2,431,591 | Snyder | Nov. 25, 1947 |
| 2,471,788 | Snyder | May 31, 1949 |
| 2,493,336 | Burger | Jan. 3, 1950 |